US011386272B2

(12) United States Patent
Makino

(10) Patent No.: US 11,386,272 B2
(45) Date of Patent: Jul. 12, 2022

(54) LEARNING METHOD AND GENERATING APPARATUS

(71) Applicant: FUJITSU LIMITED, Kawasaki (JP)

(72) Inventor: Takuya Makino, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 340 days.

(21) Appl. No.: 16/665,067

(22) Filed: Oct. 28, 2019

(65) Prior Publication Data

US 2020/0134023 A1  Apr. 30, 2020

(30) Foreign Application Priority Data

Oct. 31, 2018 (JP) .............................. JP2018-205376

(51) Int. Cl.
*G06F 40/30* (2020.01)
*G06N 7/00* (2006.01)
*G06N 20/00* (2019.01)
*G06F 40/242* (2020.01)

(52) U.S. Cl.
CPC ............ *G06F 40/30* (2020.01); *G06F 40/242* (2020.01); *G06N 7/005* (2013.01); *G06N 20/00* (2019.01)

(58) Field of Classification Search
None
See application file for complete search history.

(56) References Cited

U.S. PATENT DOCUMENTS

2018/0060564 A1* 3/2018 Shapiro .................. G06F 21/46

FOREIGN PATENT DOCUMENTS

| JP | 2004-348566 A | 12/2004 |
| JP | 2015103101 | * 11/2013 ............. G06F 17/30 |
| JP | 2014-153766 A | 8/2014 |
| JP | 2018-5324 A | 1/2018 |

* cited by examiner

*Primary Examiner* — Quynh H Nguyen
(74) *Attorney, Agent, or Firm* — Fujitsu Patent Center

(57) ABSTRACT

A computer-implemented learning method includes combining a first score for a word included in a dictionary of a model and a second score for the word calculated based on a length of the word and a number of remaining characters up to an upper limit number of characters of a summary, the first score being output in response to input of input text to the model, calculating, based on a combined score generated by the combining, a distribution of generation probabilities of the word, and updating, based on the calculated distribution of the generation probabilities, parameters in the model.

6 Claims, 11 Drawing Sheets

LEARNING METHOD AND GENERATING APPARATUS

CROSS-REFERENCE TO RELATED APPLICATION

This application is based upon and claims the benefit of priority of the prior Japanese Patent Application No. 2018-205376, filed on Oct. 31, 2018, the entire contents of which are incorporated herein by reference.

FIELD

The embodiments discussed herein are related to a learning method and a generating apparatus.

BACKGROUND

Machine learning such as a neural network may be used for automatic summarization that generates a summary from a document on newspaper, a web site, an electric bulletin board or the like. For generation of a summary, a model is used that is constructed by coupling a recurrent neural networks (RNN) encoder that vectorizes input text and an RNN decoder that repeats generation of words of a summary with reference to the vectors of input text, for example.

In such model learning, the RNN decoder sets, as input initial values, vectors of input text of a learning sample and the number of remaining characters or the like until the RNN decoder outputs an end of sentence (EOS) that is a sentence end symbol and repeatedly calculates a probability distribution of words at each time before the EOS is output. A loss calculated by comparing a word generated from the word probability distribution calculated at each time in that manner and a word being a correct answer at the time is used to update parameters in the model.

Related art is disclosed in, for example, Japanese Laid-open Patent Publication Nos. 2018-5324, 2004-348566, and 2014-153766.

SUMMARY

According to an aspect of the embodiments, a computer-implemented learning method includes combining a first score for a word included in a dictionary of a model and a second score for the word calculated based on a length of the word and a number of remaining characters up to an upper limit number of characters of a summary, the first score being output in response to input of input text to the model, calculating, based on a combined score generated by the combining, a distribution of generation probabilities of the word, and updating, based on the calculated distribution of the generation probabilities, parameters in the model.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Output of a model is influenced by the number of remaining characters to the upper limit number of characters of a summary and is not influenced by the lengths of words generated by the model. Therefore, according to the technologies in the past, generation of a word having a length exceeding the number of remaining characters may not be suppressed even in vicinity of the upper limit number of characters of a summary.

With reference to the attached drawings, a learning method, a learning program and a generating method according to embodiments will be described below. The embodiments do not limit techniques disclosed herein. It is possible to combine embodiments appropriately as long as the processing details do not conflict.

Figure 1:
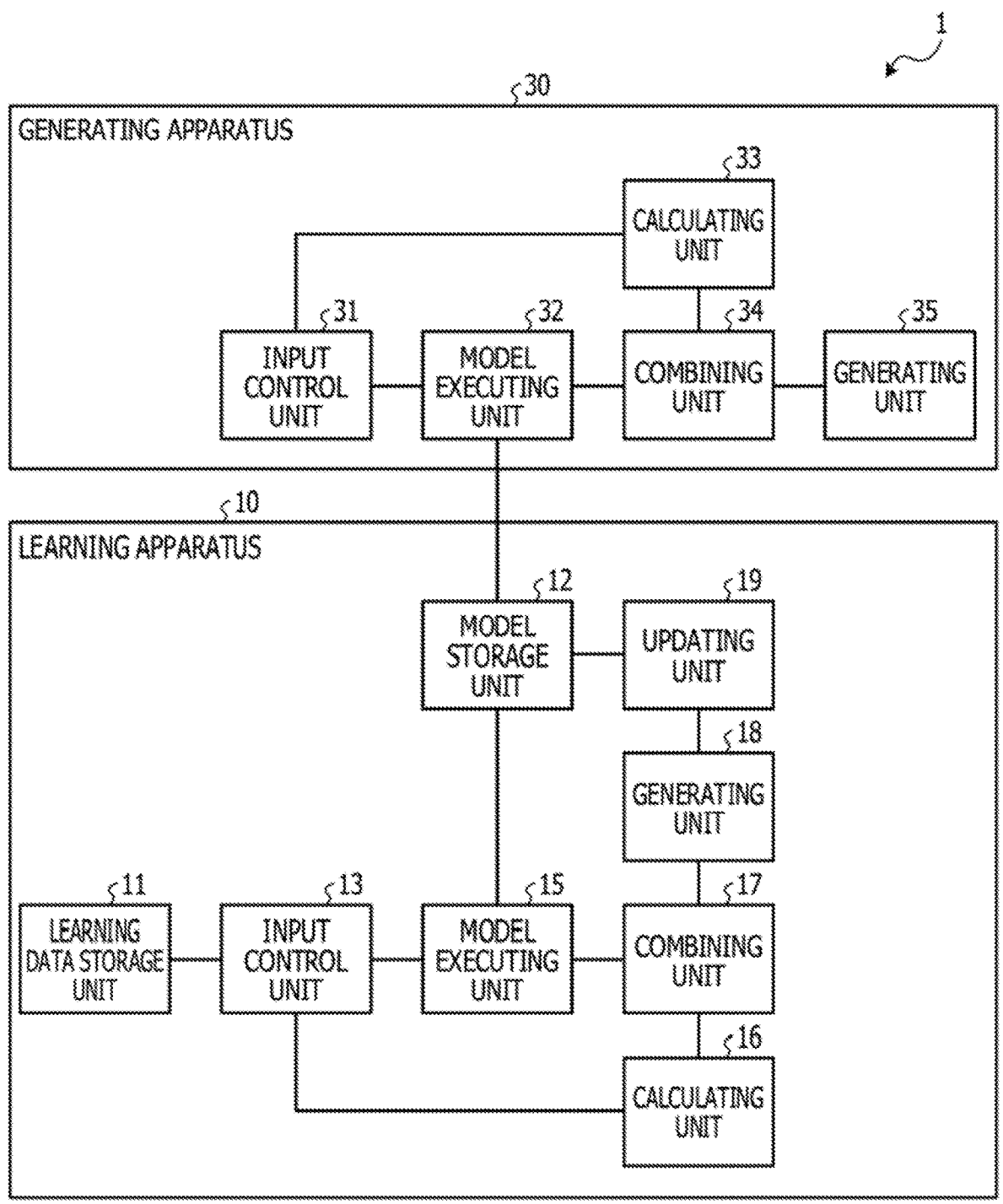
FIG. 1 is a block diagram illustrating functional configurations of apparatuses included in a system according to Embodiment 1.

FIG. 1 is a block diagram illustrating functional configurations of apparatuses included in a system according to Embodiment 1. A system 1 illustrated in FIG. 1 provides a machine learning service that performs machine learning on a model by using learning data including input text for learning and correct answer summaries and a summary generation service that generates a summary from input text by using the trained model.

As illustrated in FIG. 1, the system 1 includes a learning apparatus 10 and a generating apparatus 30. By receiving a model having learned in the learning apparatus 10, the generating apparatus 30 generates a result from data given thereto.

The learning apparatus 10 corresponds to a computer that provides the machine learning service. In a case where the learning apparatus 10 and the generating apparatus 30 are deployed in different computers, the model is passed through network communication.

According to an embodiment, the learning apparatus 10 may be implemented by installing, to a desired computer, a learning program configured to achieve the machine learning service as package software or online software. The thus installed learning program is executed by a computer so that the computer may function as the learning apparatus 10.

As an example, the learning apparatus 10 may be implemented as a server apparatus that accommodates the generating apparatus 30 as a client and that provides the machine learning service to the client. In this case, the learning apparatus 10 may be implemented as a server configured to provide the machine learning service on premise or may be implemented as a cloud configured to provide the machine learning service by outsourcing.

For example, the learning apparatus 10 receives input of learning data including a plurality of learning samples or identification information with which learning data may be invoked over a network or through a storage medium and outputs a learning result of the model to the generating apparatus 30. In this case, as an example, the learning apparatus 10 may provide parameters of the model of a neural network to which an RNN encoder and an RNN decoder are coupled. In addition, the learning apparatus 10 may provide an application program functionally including summary generation implemented by using a trained model. For example, the learning apparatus 10 may provide an application program that generates, as a summary, an article title from original text of an article in newspaper, an electric bulletin board, a web site or the like or generates a prompt report from original text of such an article as a summary.

The forms of provision of the machine learning service are examples, and the machine learning service may be provided in provision forms other than the examples described above. For example, the learning program itself that implements the machine learning service may be provided as package software or online software, or a computer incorporating the learning program may be provided.

The generating apparatus 30 corresponds to an example of a computer that provides the summary generation service. According to an embodiment, the generating apparatus 30 may be implemented by installing, to a desired computer, a summary generating program configured to achieve the summary generation service as package software or online software. The thus installed summary generating program is executed by a computer so that the computer may function as the generating apparatus 30.

As an example, the summary generation service may be provided as one such as "article summarization tool" of tools of web services provided for media operators who run media such as newspaper, an electric bulletin board, and a web site. In this case, frontend functions such as input of original text and display of a summary among functions provided as the web services may be implemented in a terminal apparatus of a journalist, an editor or the like, and backend functions such as generation of a summary may be implemented in the generating apparatus 30.

Figure 2:
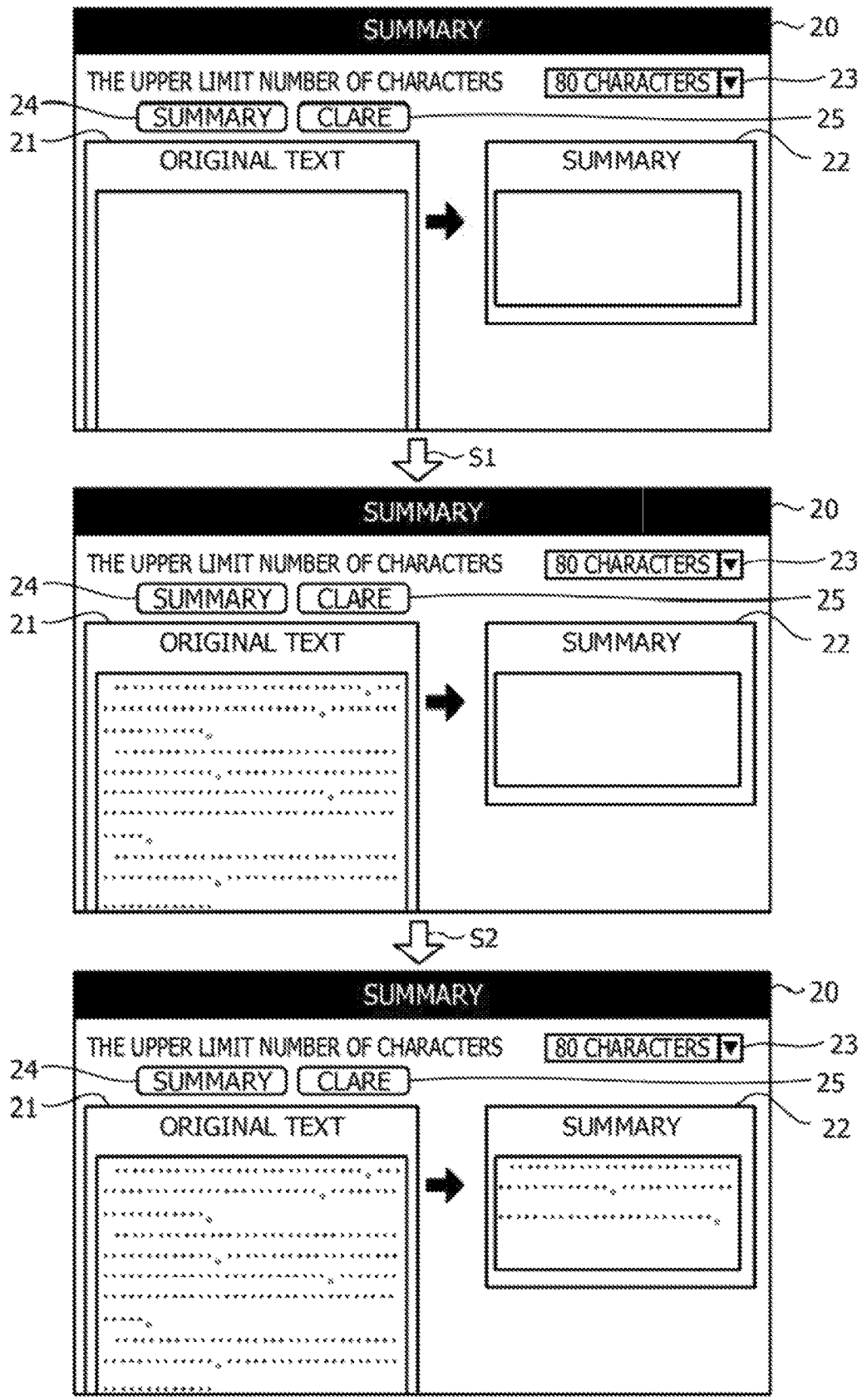
FIG. 2 is a diagram illustrating an example of a use case of an article summarization tool.

FIG. 2 is a diagram illustrating an example of a use case of an article summarization tool. FIG. 2 illustrates an example of a transition of an article summarization screen 20 displayed on a terminal apparatus used by a person associated with a media operator.

The upper part of FIG. 2 illustrates the article summarization screen 20 at an initial state without any input set for items. For example, the article summarization screen 20 includes graphical user interface (GUI) components such as an original text input area 21, a summary display area 22, a pull-down menu 23, a summarization button 24, and a clear button 25. Among them, the original text input area 21 corresponds to an area in which original text such as an article is to be input. The summary display area 22 corresponds to an area that displays a summary corresponding to the original text input to the original text input area 21. The pull-down menu 23 corresponds to an example of a GUI component with which the upper limit number of characters of the summary is designated. The summarization button 24 corresponds to an example of a GUI component that receives execution of a command to generate a summary corresponding to the original text input to the original text input area 21. The clear button 25 corresponds to an example of a GUI component that clears the original text input to the original text input area 21.

As illustrated in FIG. 2, in the original text input area 21 on the article summarization screen 20, input of text may be received through an input device such as a keyboard, not illustrated. Text may be imported from a file of a document generated by an application such as word processor software to the original text input area 21, in addition to reception of input of text through an input device.

In response to such input of original text to the original text input area 21, the article summarization screen 20 is shifted from the state illustrated in the upper part of FIG. 2 to a state illustrated in the middle part of FIG. 2 (step S1). For example, when original text is input to the original text input area 21, execution of a command that generates a summary may be received through an operation performed on the summarization button 24. The text input to the original text input area 21 may be cleared through an operation performed on the clear button 25. In addition, through the pull-down menu 23, designation of the upper limit number of characters desired by a person associated with a media operator from a plurality of upper limit numbers of characters may be received. FIG. 2 illustrates an example in which 80 characters corresponding to an example the upper limit number of characters displayable on an electric bulletin board is designated as an example of a scene where a prompt report to be displayed on the electric bulletin board is generated as a summary from original text of an article in a newspaper or news. This is given for illustration purpose, and the upper limit number of characters corresponding to a title may be selected in a case where the title is generated from an article in a newspaper or a website.

When an operation is performed on the summarization button 24 in the state that the original text input area 21 has original text, the article summarization screen 20 is shifted from the state illustrated in the middle part of FIG. 2 to a state illustrated in the lower part of FIG. 2 (step S2). In this case, the original text input to the original text input area 21 is input to the trained model as input text to generate its summary. This summary generation may be executed on a terminal apparatus of a person who associated with a media operator or may be executed on a backend server apparatus. As a result, as illustrated in the lower part of FIG. 2, the summary display area 22 on the article summarization screen 20 displays a summary generated by the trained model.

The text of the summary displayed in the summary display area 22 on the article summarization screen 20 may be edited through an input device, for example, not illustrated.

The provision of the article summarization tool allows reduction of article summarization works performed by a journalist, an editor or the like. For example, from one point of view, article summarization works require relatively large labor in a process for distributing news to media including "selection of an article to be distributed", "transmission to a media editing system", "article summarization", "title generation" and "proofreading". For example, in a case where the article summarization is performed by a human, works are required including selecting important information from a whole article and reconstructing sentences. Therefore, the technical meaning of automation or semi-automation of such article summarization works is significant.

Having described the use case in which the article summarization tool is used by a person associated with a media operator, for example, the article summarization tool may be used by a reader who receives distribution of an article from the media operator. For example, through a smart speaker or the like, the article summarization tool may be used as a function that reads aloud a summary of an article instead of a function that reads aloud whole text.

Having described the generating apparatus 30 is implemented as a computer that provides the summary generation service as an example, embodiments are not limited thereto. For example, a summary generating program incorporating the trained model may be implemented as a standalone application program executed in an arbitrary computer such as a terminal apparatus of a journalist, an editor or the like.

Having described that the machine learning service and the summary generation service are executed by different business entities, these two services may be provided by one business entity. In this case, the learning program and the summary generating program may be executed by one computer or computer system.

As described in the Background section, the generation probability of a word output from the model is influenced by the number of remaining characters to the upper limit number of characters of a summary and is not influenced by the length itself of the word generated by the model. Therefore, generation of a word having a length exceeding the number of remaining characters may not be suppressed even in vicinity of the upper limit number of characters of a summary.

Accordingly, the learning apparatus 10 according to an embodiment calculates a distribution of generation probabilities of a word by combining a second score acquired from a length of a word and the number of remaining characters up to the upper limit number of characters of a summary for each word in a dictionary of a model with a first score output for each word in the dictionary by the model.

Figure 3:
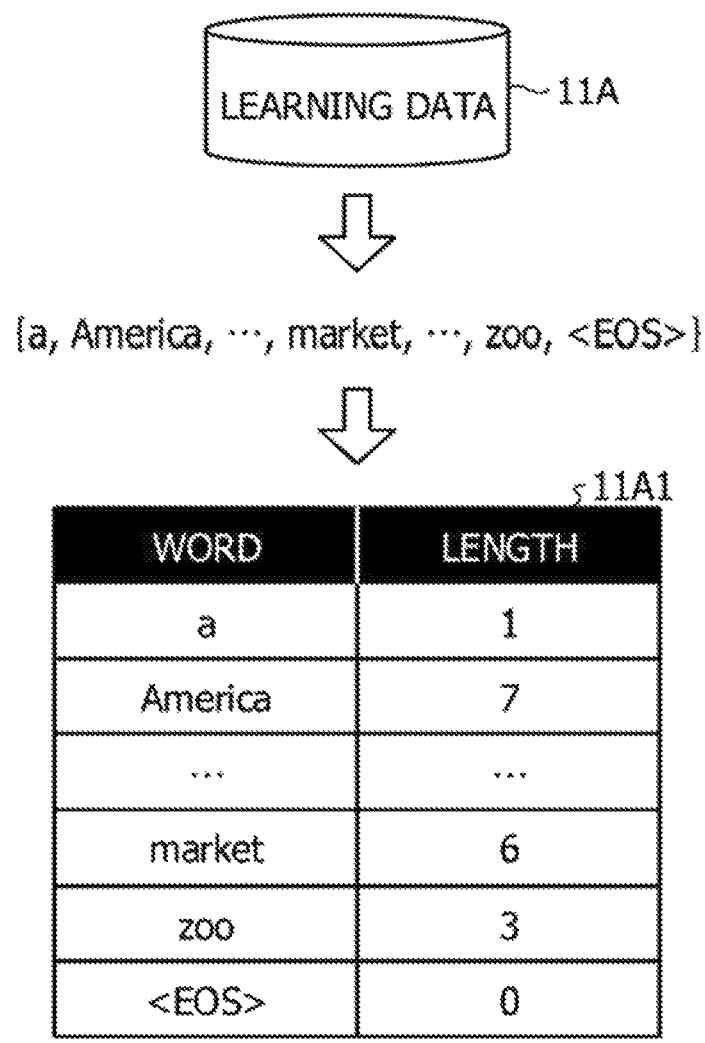
FIG. 3 is a diagram illustrating an example of a method for generating word length information.

For example, as an advance preparation for acquiring the second score, word length information is generated in which a length of a word is associated with the word in a dictionary of a model. Hereinafter, the length of a word may be called a "word length". FIG. 3 is a diagram illustrating an example of a method for generating the word length information. As illustrated in FIG. 3, a set of words {a, America, . . . , market, . . . , zoo, <EOS>} that appears in learning data 11A to be used for generating a dictionary of a model is extracted. Then, word length information 11A1 is generated by associating word lengths {1, 7, . . . , 6, . . . , 3, 0} of the elements with the set of words {a, America, . . . , market, . . . , zoo, <EOS>}. The second score is calculated from the thus generated word length information 11A1 and the number of remaining characters up to the upper limit number of characters of a summary.

Figure 4:
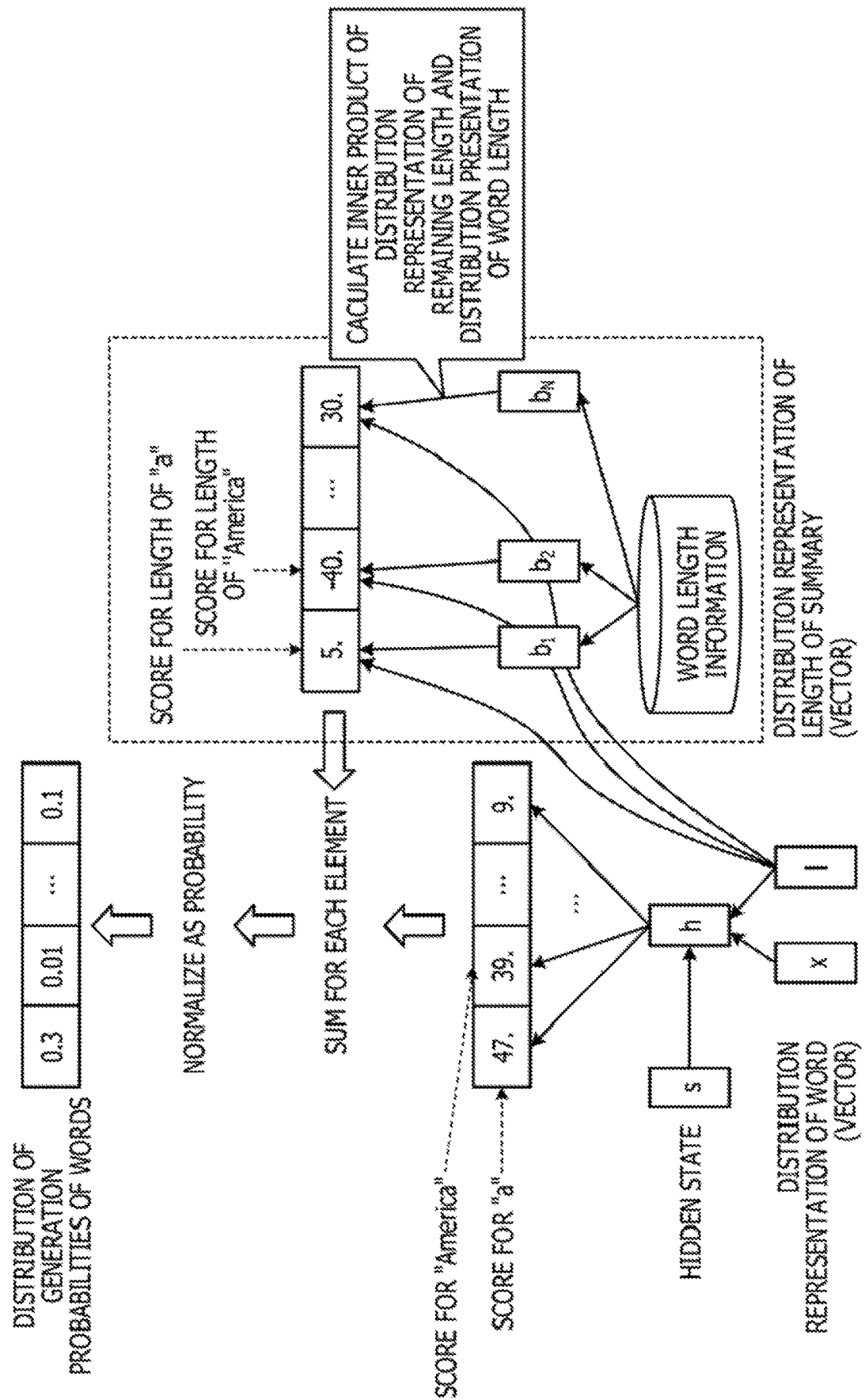
FIG. 4 is a diagram illustrating an example of calculation of a distribution of generation probabilities of words.

FIG. 4 is a diagram illustrating an example of calculation of a distribution of generation probabilities of words. FIG. 4 illustrates information to be input and output to and from long short-term memory (LSTM) cells at an nth (where n is a natural number from 1 to N) time of N LSTM cells expanded as an RNN decoder for a model every time corresponding to the number N of words of a correct answer summary input along with a learning input text. A part related to the calculation of the second score is illustrated within a dotted line frame.

As illustrated in FIG. 4, to the LSTM cell at the nth time, a hidden state s updated in the LSTM cell at the n−1 time, a word x of the correct answer summary at the n−1 time and the number I of remaining characters up to the upper limit number of characters of the summary are input. With these inputs, for each word element included in the dictionary of the model, the LSTM cell at the nth time outputs, as a first score, the degree that the word element is to be a word of a summary based on the context and the number of remaining characters up to the (n−1)th time. Thus, the first scores {47, 39, . . . , 9} are output for the word elements "a", "America", . . . , "<EOS>".

In parallel with the calculation of the first scores by the LSTM cell, second scores are calculated. In other words, for example, as illustrated in the dotted line frame in FIG. 4, the word lengths {1, 7, . . . , 6, . . . , 3, 0} are vectorized to distribution representations {$b_1, b_2, \ldots, b_n$} for the word elements "a", "America", . . . , "<EOS> included in the word length information 11A1. Inner products of the distribution representations {$b_1, b_2, \ldots, b_n$} of the word lengths and the distribution representations of the number I of remaining characters up to the upper limit number of characters of the summary are calculated for the word elements. Thus, the second scores {5, −40, . . . , 30} are calculated for the word elements "a", "America", . . . , "<EOS>".

Then, the first scores and the second scores are combined by performing linear combination that adds the first scores and the second scores for the word elements "a", "America", . . . , "<EOS>". Normalization is performed such that the sum of the scores {47+5. 39+(−40), . . . , 9+30} combined for each of the word elements "a", "America", . . . , "<EOS>" is equal to "1". Thus, a distribution {0.3, 0.01, . . . , 0.1} of the generation probabilities of the words at the nth time is acquired.

In this manner, a distribution of generation probabilities of words is calculated by combining the second scores based on the number of remaining characters and the length of the word with the first score based on the context and the number of remaining characters so that generation of a word having a length exceeding the number of remaining characters even in vicinity of the upper limit number of characters of the summary may be suppressed. For example, in a case where the number of remaining characters is low up to the upper limit number of characters of a summary, model learning may be implemented that increases the generation probability of a word having a short word length among words having similar meanings for output.

Therefore, with the learning apparatus 10 according to this embodiment, the number of characters of a word generated by the model in vicinity of the upper limit number of characters of a summary may be brought closer to the number of remaining characters.

As illustrated in FIG. 1, the learning apparatus 10 has a learning data storage unit 11, a model storage unit 12, an input control unit 13, a model executing unit 15, a calculating unit 16, a combining unit 17, a generating unit 18, and an updating unit 19. In addition to the functional units illustrated in FIG. 1, the learning apparatus 10 may include various functional units that known computers usually include, such as various input devices and various audio output devices.

The functional units such as the input control unit 13, the model executing unit 15, the calculating unit 16, the combining unit 17, the generating unit 18, and the updating unit 19 illustrated in FIG. 1 are given for illustration purpose and may be implemented virtually by the following hardware processor. Examples of such a processor include a deep learning unit (DLU), general-purpose computing on graphics processing units (GPGPU) and a GPU cluster. Examples of the processor further include a central processing unit (CPU) and a microprocessor unit (MPU). In other words, for example, the processor expands the learning program as a process on a memory such as a random-access memory (RAM) to virtually implement the aforementioned functional units. Although the DLU, the GPGPU, the GPU cluster, the CPU and the MPU are exemplified as one example of the processor here, the functional units may be implemented by any processor regardless of whether the processor is a general-purpose type or a special type. In addition, the functional units described above may be implemented by a hard wired logic circuit such as an application specific integrated circuit (ASIC) or a field-programmable gate array (FPGA).

The functional units such as the learning data storage unit 11 and the model storage unit 12 illustrated in FIG. 1 may be a storage device such as a hard disk drive (HDD), an optical disk or a solid state drive (SSD). The storage device may not be an auxiliary storage device but may be a semiconductor memory element such as a RAM, an EPPROM or a flash memory.

The learning data storage unit 11 is a storage unit that stores learning data. Here, the learning data include D learning samples, that is, learning instances, as an example. Each of the learning samples includes a pair of input text and a summary as a correct answer to be used for model learning. Hereinafter, the input text may be called a "learning input text" from a viewpoint that it is used for identifying a label of input text to be input for model learning and for summary generation. The summary as a correct answer may be called a "correct answer summary" from a view point that it is used for identifying labels of a summary referred as a correct answer and a summary generated from input text for model learning.

The model storage unit 12 is a storage unit that stores information regarding a model. According to an embodiment, the model storage unit 12 stores a model layer structure such as neurons and synapses of layers including an input layer, a hidden layer and an output layer forming a model of a neural network in which an RNN encoder and an RNN decoder are coupled and model information including parameters of the model such as weights and biases in the layers. In a stage before model learning is executed, the model storage unit 12 stores parameters initially set with random numbers as the parameters in the model. In a stage after the model learning is executed, the model storage unit 12 stores parameters in the trained model.

The input control unit 13 is a processing unit that controls inputs to the model. According to an embodiment, the input control unit 13 starts processing in response to reception of a request for model learning. When the processing is started, the input control unit 13 performs initial setting for model learning. For example, the input control unit 13 sets the number of characters designated by a user such as the number of characters of a correct answer summary as the upper limit number of characters of the summary to be generated by the model.

After the initial values to be input to the RNN decoder are set, the input control unit 13 starts inputting for each learning sample included in the learning data to the model of the neural network in which the RNN encoder and the RNN decoder are coupled.

More specifically, for example, the input control unit 13 initializes the value of a loop counter d that counts the number of learning samples. Then, the input control unit 13 obtains the learning sample corresponding to the value of the loop counter d of D learning samples stored in the learning data storage unit 11. After that, the input control unit 13 increments the value of the loop counter d and repeatedly executes processing for obtaining learning samples from the learning data storage unit 11 until the value of the loop counter d is equal to the total number D of the learning samples. Having described the example that learning data stored in a storage within the learning apparatus 10 is obtained, learning data may be obtained from an external computer coupled thereto over a network such as a file server and a removable medium.

Every time a learning sample is obtained, the input control unit 13 inputs learning input text included in the learning sample to the RNN encoder. Thus, vectors acquired by vectorizing word strings in the learning input text, that is, intermediate representations are output from the RNN encoder to the RNN decoder. At the same time as or before or after the operation, the input control unit 13 initializes the value at a register holding the number of remaining characters until an EOS called a sentence end symbol is output from the RNN decoder to the upper limit number of characters set by the input control unit 13. Details of input to the RNN decoder, output from the RNN data and parameters of the model using them after that will be described below.

The model executing unit 15 is a processing unit that executes the model in which an RNN encoder 15A and an RNN decoder 15B are coupled. According to one aspect, the model executing unit 15 expands, on a work area, M LSTMs corresponding to the number M of words in learning input text input by the input control unit 13 based on model information stored in the model storage unit 12. Thus, the M LSTMs are functioned as an RNN encoder. In this RNN encoder, under input control by the input control unit 13, in order from the first word of the learning input text, the mth word from the beginning of the learning input text is input to the LSTM corresponding to the mth word, and output of the LSTM corresponding to the (m−1)th word is input to the LSTM corresponding to the mth word. By repeating this input from the LSTM corresponding to the first word to the LSTM corresponding to the Mth word at the end, vectors, that is, intermediate representations of the learning input text are acquired. Thus, the intermediate representations of the learning input text generated by the RNN encoder are input to the RNN decoder.

According to another aspect, the model executing unit 15 expands, on a work area, N LSTMs corresponding to the number N of words in the correct answer summary input by the input control unit 13 based on model information stored in the model storage unit 12. Thus, the N LSTMs are functioned as an RNN decoder. To the RNN decoder, under control of the input control unit 13, the intermediate representations of the learning input text are input from the RNN encoder, and the number of remaining characters until an EOS tag is output from the input control unit 13 for each set of N LSTMs is input. The N LSTMs are operated based on the inputs so that the RNN decoder outputs a first score for each word element of N LSTMs to the combining unit 17.

For example, as illustrated in FIG. 4, a hidden state s updated to the LSTM cell at the (n−1)th time, a word x of a correct answer summary at the (n−1)th time and the number I of remaining characters up to the upper limit number of characters of the summary are input to the LSTM cell at the nth time. To the LSTM cell at the first time, a hidden state s output from the RNN encoder, a begin of sentence (BOS) tag, and the upper limit number of characters of a summary are input. With these inputs, for each word element included in the dictionary of the model, the LSTM cell at the nth time outputs, as a first score, the degree that the word element is to be a word of a summary based on the context and the number of remaining characters up to the (n−1)th time.

The calculating unit 16 is a processing unit that calculates a second score based on the word length of each word element and the number of remaining characters up to the upper limit number of characters of a summary. For example, in order to calculate a second score for the nth time, the calculating unit 16 calculates an inner product, for each word element, of the distribution representations $\{b_1, b_2, \ldots, b_n\}$ acquired by vectorizing the word lengths $\{1, 7, \ldots, 6, \ldots, 3, 0\}$ for the word elements "a", "America", ..., "<EOS>" included in the word length information 11A1 and the distribution representation of the number I of remaining characters, as illustrated in the dotted line frame in FIG. 4. Thus, the calculating unit 16 calculates the second scores $\{5, -40, \ldots, 30\}$ for the word elements "a", "America", ..., "<EOS>".

The combining unit 17 is a processing unit that combines the first score and the second score. For example, in order to combine the first score and the second score at the nth time, the combining unit 17 combines the first score and the second score by performing linear combination that adds the first score output by the LSTM at the nth time and the second score calculated by the calculating unit 16 for each of the word elements "a", "America", ..., "<EOS>", as illustrated in the dotted line frame in FIG. 4. Thus, combined scores $\{47+5, 39+(-40), \ldots, 9+30\}$ are acquired by combining the first scores and the second scores for the word elements "a", "America", ..., "<EOS>". The combining unit 17 then performs normalization such that the sum of the combined scores $\{52, -1, \ldots, 39\}$ combined for the word elements "a", "America", ..., "<EOS>" is equal to "1". Thus, a distribution $\{0.3, 0.01, \ldots, 0.1\}$ of the generation probabilities of the words at the nth time is acquired.

The generating unit 18 is a processing unit that generates a word of a summary. According to an embodiment, the generating unit 18 generates a word having the highest probability in the distribution of generation probabilities of words to be output at the nth time by the combining unit 17 as the nth word from the beginning of the summary.

The updating unit 19 is a processing unit that updates parameters in the model. According to an embodiment, when the nth word of a summary is generated by the generating unit 18, the updating unit 19 calculates a loss from the nth word of words included in the correct answer summary and the nth word generated by the generating unit 18. Then, when a loss for each set of N LSTMs in the RNN decoder is calculated, the updating unit 19 executes log-likelihood optimization based on the loss of each LSTM so that parameters to update the model of the RNN decoder are calculated. Then, the updating unit 19 updates the parameters in the model stored in the model storage unit 12 with the parameters acquire by the log-likelihood optimization. This parameter update may be repeatedly executed over all learning samples and may be repeatedly executed over a predetermined number of epochs of learning data D.

The distributions of the generation probabilities of words are compared before and after the parameter update in the model. Here, FIG. 5 illustrates an example in which a distribution of generation probabilities of words used for Tth round model learning is calculated, and FIG. 6 illustrates an example in which a distribution of generation probabilities of words used for (T+1)th round model learning is calculated.

Figure 5:
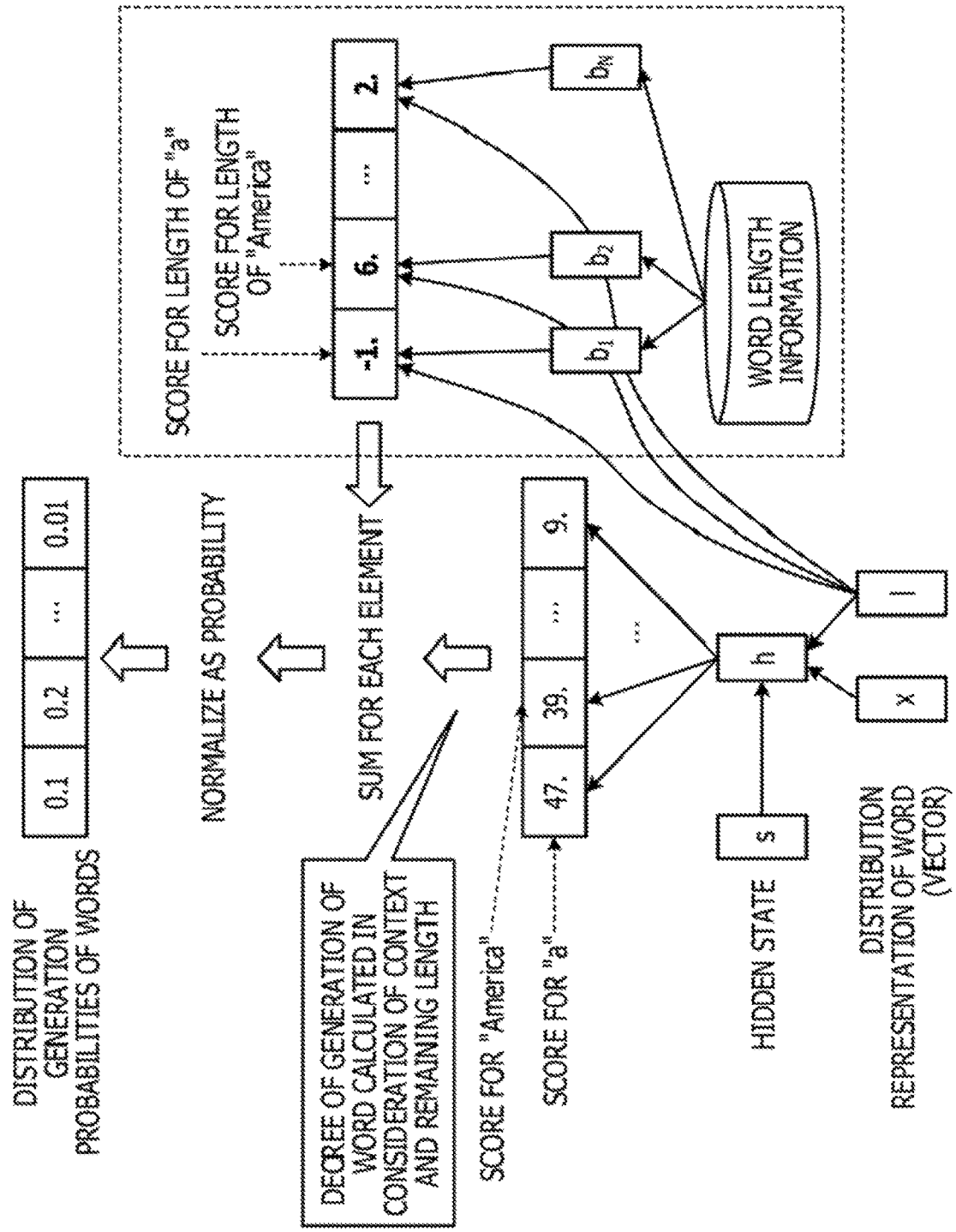
FIG. 5 is a diagram illustrating an example of calculation of a distribution of generation probabilities of words.
Figure 6:
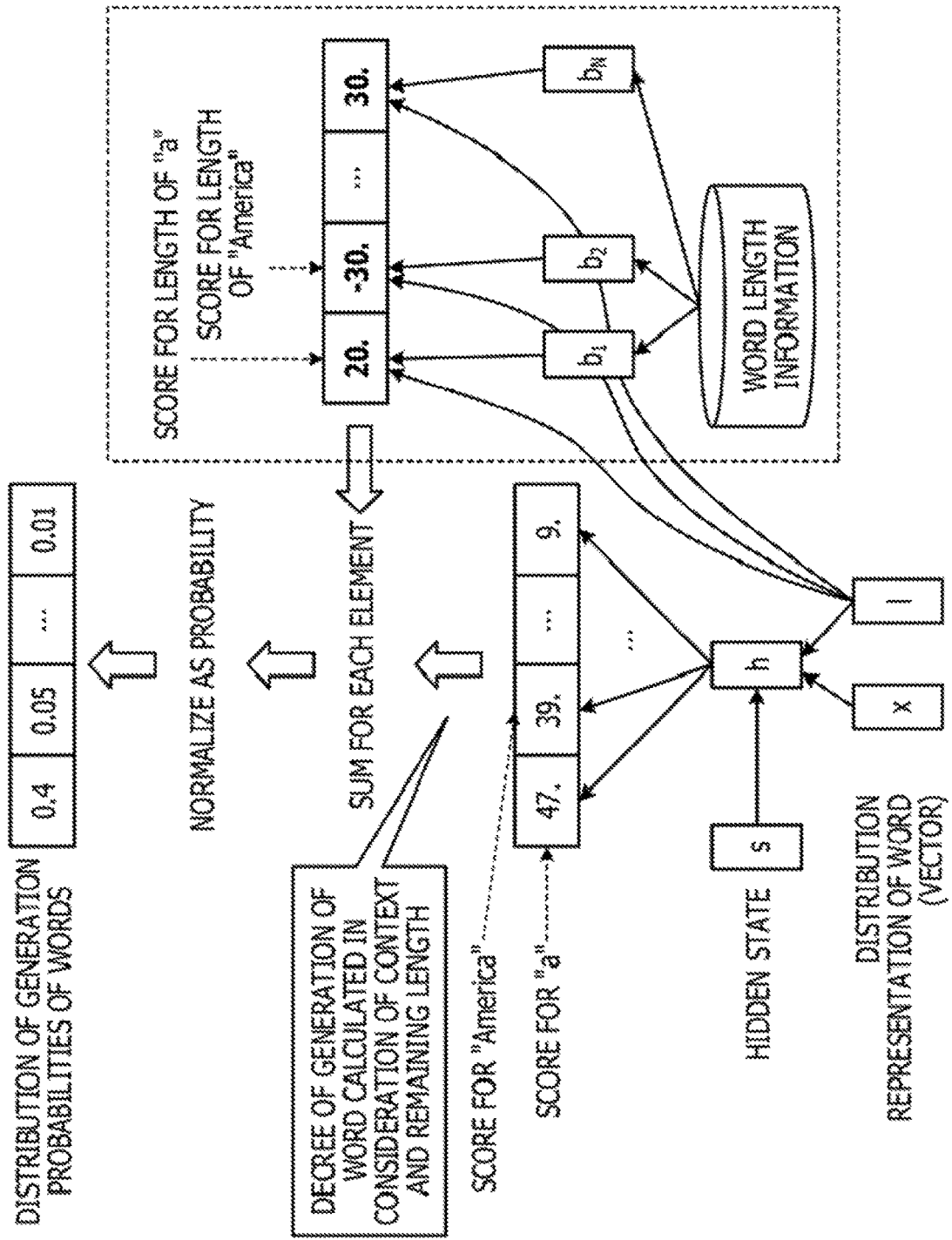
FIG. 6 is a diagram illustrating an example of calculation of a distribution of generation probabilities of words.

FIGS. 5 and 6 are diagrams illustrating an example of calculation of a distribution of generation probabilities of words. FIGS. 5 and 6 illustrate an example in which the number I (=2) of remaining characters up to the upper limit number of characters of a summary is input to the LSTM cell at (n−1)th time of N LSTM cells expanded as an RNN decoder in the model at every time corresponding to the number N of words of the correct answer summary input along with learning input text.

As illustrated in FIG. 5, to the LSTM cell at the (n−1)th time, a hidden state s updated in the LSTM cell at the (n−2)th time, a word x of the correct answer summary at the (n−2)th time and the number "2" of remaining characters up to the upper limit number of characters of the summary are input. With these inputs, the LSTM cell at the (n−1)th time outputs, as a first score, the degree that the word element is to be a word of a summary based on the context and the number of remaining characters up to the (n−2)th time for each word element included in the dictionary of the model. Thus, the first scores $\{47, 39, \ldots, 9\}$ are output for the word elements "a", "America", ..., "<EOS>".

In parallel with the calculation of the first scores by the LSTM cell, second scores are calculated. In other words, for example, as illustrated in the dotted line frame in FIG. 5, the word lengths $\{1, 7, \ldots, 6, \ldots, 3, 0\}$ are vectorized to distribution representations $\{b_1, b_2, \ldots, b_n\}$ for the word elements "a", "America", ..., "<EOS>" included in the word length information 11A1. Inner products of the distribution representations $\{b_1, b_2, \ldots, b_n\}$ of the word lengths and the distribution representations of the number "2" of remaining characters up to the upper limit number of characters of the summary are calculated for the word elements. Thus, the second scores $\{-1, 6, \ldots, 2\}$ are calculated for the word elements "a", "America", ..., "<EOS>".

Then, the first scores and the second scores are combined by performing linear combination that adds the first scores and the second scores for the word elements "a", "America", ..., "<EOS>". Thus, combined scores $\{47+(-1), 39+6, \ldots, 9+2\}$ are acquired by combining the first scores and the second scores for the word elements "a", "America", ..., "<EOS>". Normalization is then performed such that the sum of the combined scores $\{46, 45, \ldots, 11\}$ combined for the word elements "a", "America", ..., "<EOS>" is equal to "1.". Thus, a distribution $\{0.1, 0.2, \ldots, 0.01\}$ of the generation probabilities of the words at the (n−1)th time is acquired.

After that, the Tth round model learning is performed based on the distribution $\{0.1, 0.2, \ldots, 0.01\}$ of the generation probabilities of the words at the (n−1)th time.

Next, as illustrated in FIG. 6, at the (T+1)th round, to the LSTM cell at the (n−1)th time, a hidden state s updated in the LSTM cell at the (n−2)th time, a word x of the correct answer summary at the (n−2)th time and the number "2" of remaining characters up to the upper limit number of characters of the summary are input. With these inputs, the LSTM cell at the (n−1)th time outputs, as a first score, the degree that the word element is to be a word of a summary based on the context and the number of remaining characters up to the (n−2)th time for each word element included in the dictionary of the model. Thus, the first scores $\{47, 39, \ldots, 9\}$ are output for the word elements "a", "America", ..., "<EOS>".

In parallel with the calculation of the first scores by the LSTM cell, second scores are calculated. In other words, for example, as illustrated in the dotted line frame in FIG. 6, the word lengths $\{1, 7, \ldots, 6, \ldots, 3, 0\}$ are vectorized to distribution representations $\{b_1, b_2, \ldots, b_n\}$ for the word elements "a", "America", ..., "<EOS>" included in the word length information 11A1. Inner products of the distribution representations $\{b_1, b_2, \ldots, b_n\}$ of the word lengths and the distribution representations of the number "2" of remaining characters up to the upper limit number of characters of the summary are calculated for the word elements. Thus, the second scores {20, −30, . . . , 30} are calculated for the word elements "a", "America", . . . , "<EOS>".

Then, the first scores and the second scores are combined by performing linear combination that adds the first scores and the second scores for the word elements "a", "America", . . . , "<EOS>". Thus, a combined score {47+20, 39+(−30), . . . , 9+30} is acquired by combining the first scores and the second scores for the word elements "a", "America", . . . , "<EOS>". Normalization is then performed such that the sum of the combined score {67, 9, . . . , 39} combined for the word elements "a", "America", . . . , "<EOS>" is equal to "1.". Thus, a distribution {0.4, 0.05, . . . , 0.01} of the generation probabilities of the words at the (n−1)th time is acquired.

By comparing the distribution {0.1, 0.2, . . . , 0.01} of generation probabilities of the words at the Tth round and the distribution {0.4, 0.05, . . . , 0.01} of generation probabilities of the words at the (T+1)th round, the following points may be found.

That is, the generation probability for the word "America" is the highest at the Tth round. Though the number of remaining characters is "2", the word "America" having seven characters is generated at the (n−1)th time. Therefore, as a result of subtraction of eight characters including a space+the word "America" from the number "2" of remaining characters, a summary having six characters more than the upper limit number of characters is generated.

On the other hand, at the (T+1)th round, the generation probability for the word "America" decreases to 0.05, and the generation probability for the word "a" increases to 0.4. Therefore, though the number of remaining characters is "2", the word "a" that is two characters including a space may be generated at the (n−1)th time instead of the word "America" that is eight characters including a space. Therefore, two characters including a space+the word "a" is subtracted from the number "2" of remaining characters. As a result, model learning may be achieved by bringing the number of characters of a word to be generated by the model closer to the number of remaining characters in vicinity of the upper limit number of characters of the summary so that the generated summary has characters under the upper limit number of characters.

As illustrated in FIG. 1, the generating apparatus 30 has an input control unit 31, a model executing unit 32, a calculating unit 33, a combining unit 34, and a generating unit 35. In addition to the functional units illustrated in FIG. 1, the generating apparatus 30 may include various functional units that known computers usually include, such as various input devices and various audio output devices.

The functional units such as the input control unit 31, the model executing unit 32, the calculating unit 33, the combining unit 34, and the generating unit 35 illustrated in FIG. 1 are given for illustration purpose and may be implemented virtually by the following hardware processor. Examples of the processors may include a DLU, a GPGPU and a GPU cluster. Examples of the processors may further include a CPU and an MPU. In other words, for example, the processor expands the summary generating program as a process on a memory such as a RAM to virtually implement the aforementioned functional units. Although the DLU, the GPGPU, the GPU cluster, the CPU and the MPU are exemplified as one example of the processor here, the functional units may be implemented by any processor regardless of whether the processor is a general-purpose type or a special type. In addition, the functional units described above may be implemented by a hard wired logic circuit such as an ASIC or FPGA.

The input control unit 31 is a processing unit that controls inputs to the model. According to an embodiment, the input control unit 31 starts processing in response to reception of a request for summary generation. When such processing is started, the input control unit 31 receives input text from which a summary is to be generated and a designation of the upper limit number of characters of the summary to be generated by the trained model. After that, the input control unit 31 inputs the input text to the RNN encoder. Thus, vectors acquired by vectorizing a word string in the input text, that is, intermediate representations are output from the RNN encoder to the RNN decoder. At the same time or before or after the operation, the input control unit 31 initializes the value at a register holding the number of remaining characters until an EOS being a sentence end symbol is output to the RNN decoder to the designated upper limit number of characters. Details of input to the RNN decoder, output from the RNN data and generation of a summary using them after that will be described below.

The model executing unit 32 is a processing unit that executes the model in which the RNN encoder and the RNN decoder are coupled. According to one aspect, the model executing unit 32 expands, on a work area, K LSTMs corresponding to the number K of words in the input text input by the input control unit 31 based on model information of the trained model stored in the model storage unit 12 so that the K LSTMs are caused to function as an RNN encoder. In this RNN encoder, under input control by the input control unit 31, in order from the first word of the input text, the kth word from the beginning of the input text is input to the LSTM corresponding to the kth word, and output of the LSTM corresponding to the (k−1)th word is input to the LSTM corresponding to the kth word. By repeating this input from the LSTM corresponding to the first word to the LSTM corresponding to the Kth word at the end, vectors, that is, intermediate representations of the input text are acquired. Thus, the intermediate representations of the input text generated by the RNN encoder are input to the RNN decoder.

According to another aspect, the model executing unit 32 expands, on a work area, LSTMs up to the output of the EOS tag based on model information of the trained model stored in the model storage unit 12 so that J LSTMs expanded up to the output of the EOS tag are caused to function as an RNN decoder. To the RNN decoder, under control of the input control unit 31, the intermediate representations of the input text are input from the RNN encoder and the number of remaining characters until the EOS tag is output from the input control unit 31 for each set of J LSTMs is input. The J LSTMs are operated based on the input so that the RNN decoder outputs first scores for word elements of J LSTMs to the combining unit 34.

For example, a hidden state s' updated to the LSTM cell at the (j−1)th time, a word x' of a summary at the (j−1)th time and the number I' of remaining characters up to the upper limit number of characters of the summary are input to the LSTM cell at the jth time (where j is a natural number of 1 to J). To the LSTM cell at the first time, a hidden state s' output from the RNN encoder, a BOS tag, and the upper limit number of characters of a summary are input. With these inputs, the LSTM cell at the jth time outputs, as a first score, the degree that the word element is to be a word of a summary based on the context and the number of remaining characters up to the (j−1)th time for each word element included in the dictionary of the model.

The calculating unit 33 is a processing unit that calculates a second score based on the word length of each word element and the number of remaining characters up to the upper limit number of characters of a summary. For example, in order to calculate a second score for the jth time, the calculating unit 33 calculates an inner product, for each word element, of the distribution representation {$b_1$, $b_2$, ..., $b_n$} acquired by vectorizing the word lengths {1, 7, ..., 6, ..., 3, 0} for the word elements "a", "America", ..., "<EOS>" included in the word length information 11A1 and the distribution representation of the number I' of remaining characters. Thus, the calculating unit 33 calculates the second scores for the word elements "a", "America", ..., "<EOS>".

The combining unit 34 is a processing unit that combines the first score and the second score. For example, in order to combine the first score and the second score at the jth time, the combining unit 34 combines the first score and the second score by performing linear combination that adds the first score output by the LSTM at the jth time and the second score calculated by the calculating unit 33 for each of the word elements "a", "America", ..., "<EOS>". Thus, a combined score is acquired by combining the first score and the second score for each of the word elements "a", "America", ..., "<EOS>". The combining unit 34 then performs normalization such that the sum of the combined scores combined for the word elements "a", "America", ..., "<EOS>" is "1". Thus, the distribution of the generation probabilities of each word at the jth time is acquired.

The generating unit 35 is a processing unit that generates a summary. According to an embodiment, when a distribution of probabilities of words is output from the jth LSTM in the RNN decoder, the generating unit 35 generates the word having the highest probability in the probability distribution as the jth word from the beginning of the summary. After that, when an EOS tag is output from the Jth LSTM in the RNN decoder, the generating unit 35 joins words generated sequentially from the first LSTM to the Jth LSTM to generate a summary and outputs the generated summary to a predetermined output destination such as a terminal apparatus coupled to the generating apparatus 30.

Figure 7:
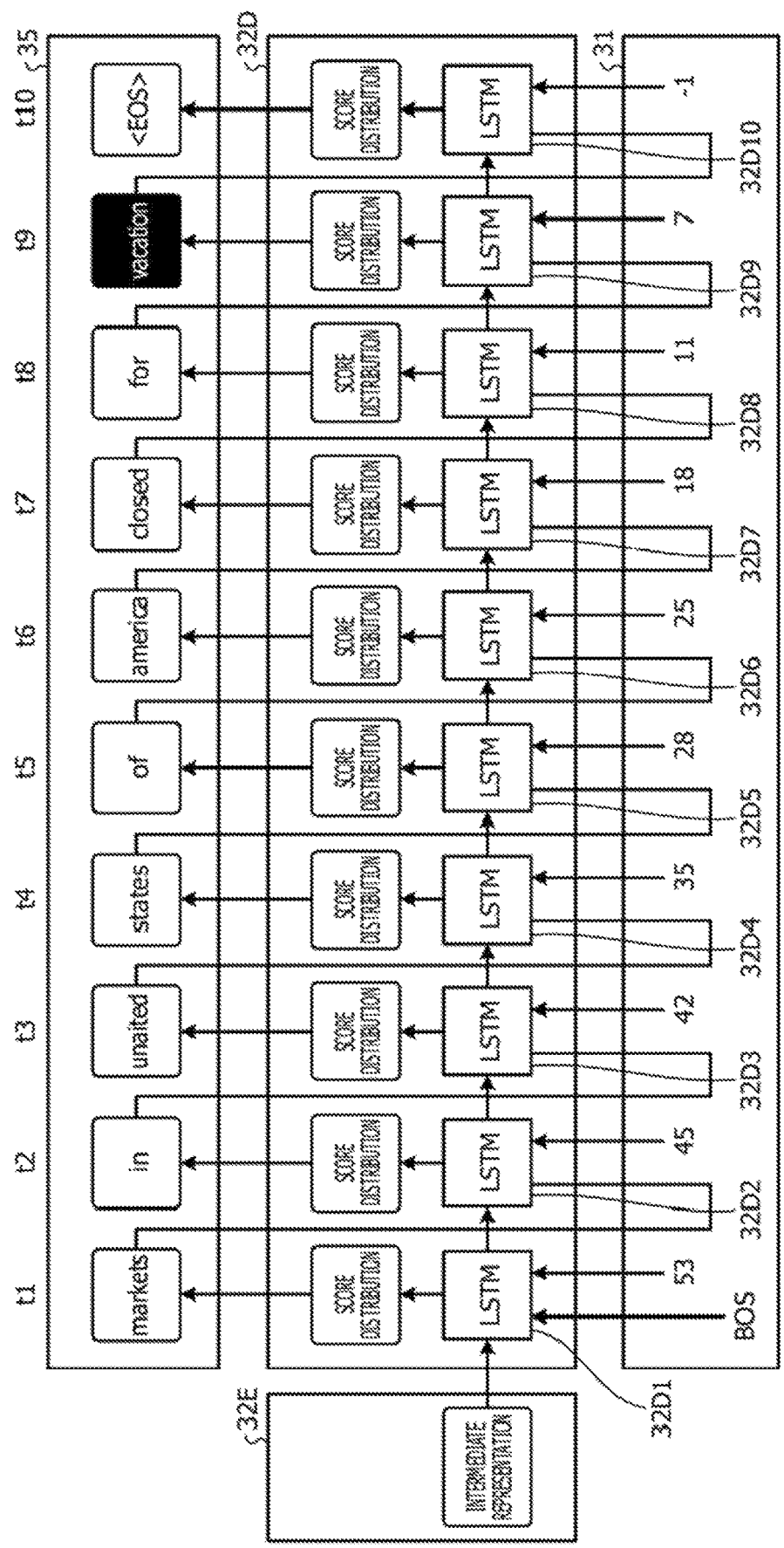
FIG. 7 is a diagram illustrating an example of summary generation.
Figure 8:
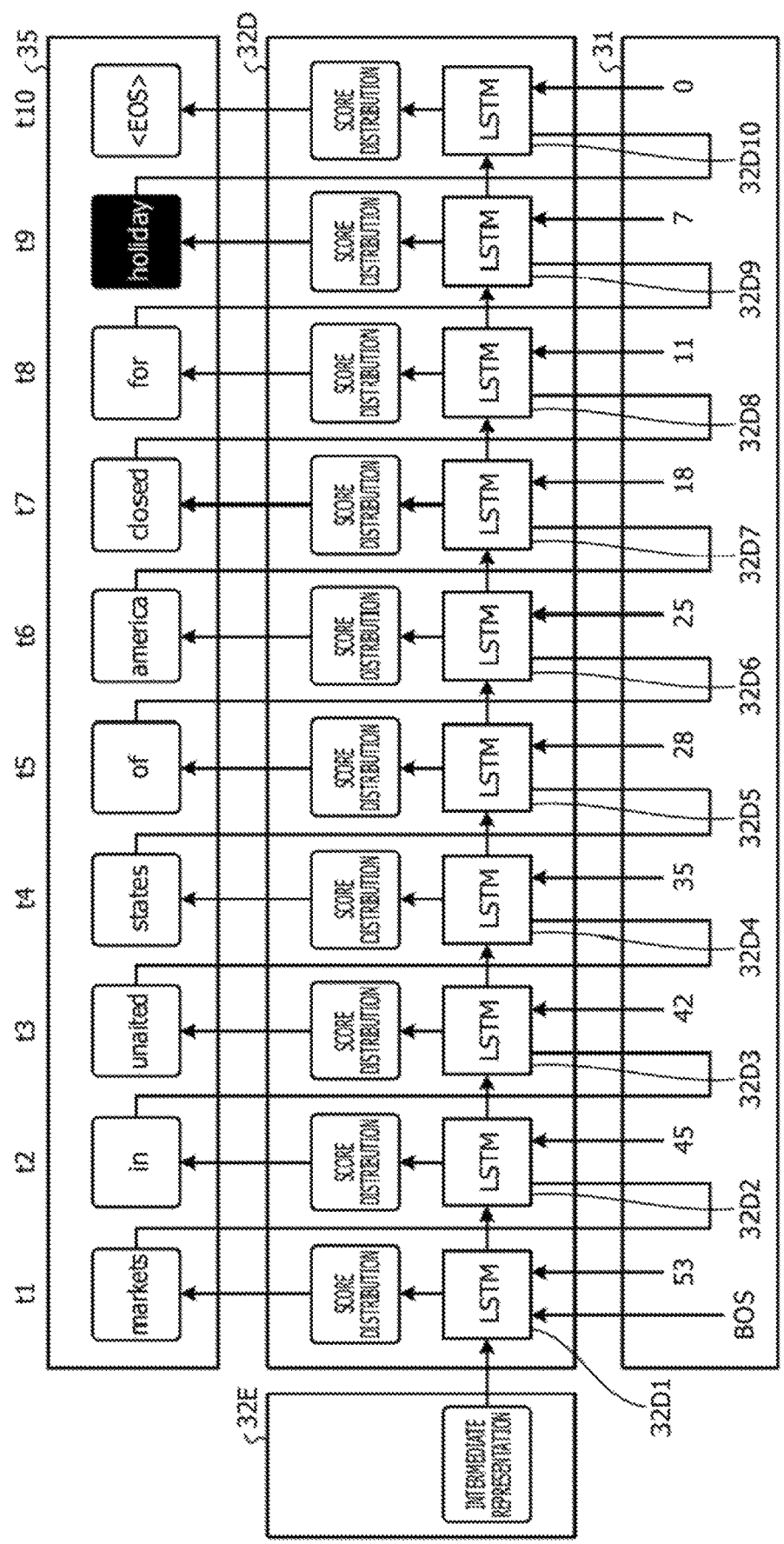
FIG. 8 is a diagram illustrating an example of summary generation.

With reference to FIGS. 7 and 8, specific examples of summary generation according to a technology in the past and according to this embodiment will be described below. FIGS. 7 and 8 are diagrams illustrating examples of summary generation. FIG. 7 schematically illustrates an operation example in which a summary is generated according to a method for calculating a distribution of generation probabilities of each word in a technology in the past. On the other hand, FIG. 8 schematically illustrates operation details by which a summary is generated according to a method for calculating a distribution of generation probabilities of words in this embodiment.

In the summary generation processing according to a technology in the past, as illustrated in FIG. 7, under control of the input control unit 31, an intermediate representation of input text from the LSTM at the end of the RNN encoder is input to the first LSTM 32D1 at the first time. In addition, a BOS tag and the upper limit number "53" of characters designated as an initial value of the number of remaining characters up to the output of EOS by the RNN decoder are input to the first LSTM 32D1 from the input control unit 31. As a result of such inputs, the LSTM 32D1 calculates a probability distribution of a word at the first time (t=1) by calculating probabilities of words registered with the dictionary of the trained model, that is, words appearing in learning input text in the entire learning sample and updates the intermediate representations of the input text 40. Then, the LSTM 32D1 outputs the probability distribution of words at the first time to the generating unit 35 and the intermediate representation updated at the first time to the next LSTM 32D2.

In this manner, when the probability distribution of words at the first time is output, the generating unit 35 generates a word having the highest probability in the probability distribution, "markets" in this example, as the first word of the summary. After that, the input control unit 31 subtracts a total "8" of the number of character "1" for a space and the number of characters "7" for the word "markets" generated at the first time from the initial value "53" of the number of remaining characters held at a register to update the value of the number of remaining characters from "53" to "45".

Next, at the second time, the intermediate representation updated at the first time is input from the LSTM 32D1 to the LSTM 32D2. With this, under control of the input control unit 31, the word "markets" generated at one time before the second time, that is, at the first time is input to the LSTM 32D2, and the number "45" of remaining characters held at the register is also input to the LSTM 32D2. Thus, the LSTM 32D2 calculates a probability distribution of words at the second time (t=2) by calculating a probability of words registered with the dictionary of the trained model and updates the hidden state. Then, the LSTM 32D2 outputs the probability distribution of words at the second time to the generating unit 35 and the intermediate representation updated at the second time to the next LSTM 32D3.

In this manner, when the probability distribution of words at the second time is output, the generating unit 35 generates a word having the highest probability in the probability distribution, "in" in this example, as the second word from the beginning of the summary. After that, the input control unit 31 subtracts a total "3" of the number "1" of character for a space and the number "2" of characters for the word "in" generated at the second time from the value "45" of the number of remaining characters held at the register to update the value of the number of remaining characters from "45" to "42".

This processing is repeatedly executed up to the tenth time where the sentence end symbol "BOS" is output from the LSTM 32D10. As a result, by joining the words generated from the first time to the tenth time, a summary "markets in united states of america closed for vacation <EOS>" is generated.

In the summary generation processing according to this embodiment, as illustrated in FIG. 8, under control of the input control unit 31, an intermediate representation of input text from the LSTM at the end of the RNN encoder is input to the first LSTM 32D1 at the first time. In addition, a BOS tag and the upper limit number "53" of characters designated as an initial value of the number of remaining characters up to the output of EOS by the RNN decoder are input to the first LSTM 32D1 from the input control unit 31. As a result of such inputs, the LSTM 32D1 outputs a first score for each word element registered with the dictionary of the trained model, updates the hidden state of the input text and outputs the update state updated at the first time to the next LSTM 32D2. Furthermore, a second score is calculated for each word element by the calculating unit 33. Then, the combining unit 34 normalizes the combined scores acquired by combining the first scores and the second scores to calculate a distribution of generation probabilities of words at the first time (t=1). The combining unit 34 then outputs the probability distribution of words at the first time to the generating unit 35.

In this manner, when the probability distribution of words at the first time is output, the generating unit 35 generates a word having the highest probability in the probability distribution, "markets" in this example, as the first word of the summary. After that, the input control unit 31 subtracts a total "8" of the number of character "1" for a space and the number of characters "7" for the word "markets" generated at the first time from the initial value "53" of the number of remaining characters held at a register to update the value of the number of remaining characters from "53" to "45".

Next, at the second time, the intermediate representation updated at the first time is input from the LSTM 32D1 to the LSTM 32D2. With this, under control of the input control unit 31, the word "markets" generated at one time before the second time, that is, at the first time is input to the LSTM 32D2, and the number "45" of remaining characters held at the register is also input to the LSTM 32D2. As a result of such inputs, the LSTM 32D2 outputs a first score for each word element registered with the dictionary of the trained model, updates the hidden state of the LSTM 32D1 at the first time and outputs the update state updated at the second time to the next LSTM 32D3. Furthermore, a second score is calculated for each word element by the calculating unit 33. Then, the combining unit 34 normalizes the combined score acquired by combining the first scores and the second scores to calculate a distribution of generation probabilities of words at the second time (t=2). The combining unit 34 then outputs the probability distribution of words at the second time to the generating unit 35.

In this manner, when the probability distribution of words at the second time is output, the generating unit 35 generates a word having the highest probability in the probability distribution, "in" in this example, as the second word from the beginning of the summary. After that, the input control unit 31 subtracts a total "3" of the number "1" of character for a space and the number "2" of characters for the word "in" generated at the second time from the value "45" of the number of remaining characters held at the register to update the value of the number of remaining characters from "45" to "42".

This processing is repeatedly executed up to the tenth time where the sentence end symbol "BOS" is output from the LSTM 32D10. As a result, by joining the words generated from the first time to the tenth time, a summary "markets in united states of america closed for holiday <EOS>" is generated.

Comparing the summary generation processing in the technology in the past and the summary generation processing in this embodiment, it may be found that the result at the ninth time is different. For example, in the summary generation processing according to the technology in the past, when the model outputs the word "vacation" at the ninth time, the number "8" of characters for the word "vacation" is subtracted from the number of remaining characters "7". As a result, a summary having one character exceeding from the upper limit number of characters is generated. On the other hand, for example, in the summary generation processing in this embodiment, the model outputs a word "holiday" having a similar meaning to that of the word "vacation" at the ninth time so that the number "7" of characters for the word "holiday" is subtracted from the number "7" of remaining characters. As a result, a summary having the number of characters equal to the upper limit number of characters without exceeding is generated. Therefore, with the generating apparatus 30 according to this embodiment, the number of characters of a word generated by the model in vicinity of the upper limit number of characters of a summary may be close to the number of remaining characters, and summary generation without exceeding the upper limit number of characters may be achieved.

The following describes the process of processing at the system according to this embodiment. The learning processing to be executed by the learning apparatus 10 will be described first, and the generation processing to be executed by the generating apparatus 30 will then be described.

Figure 9:
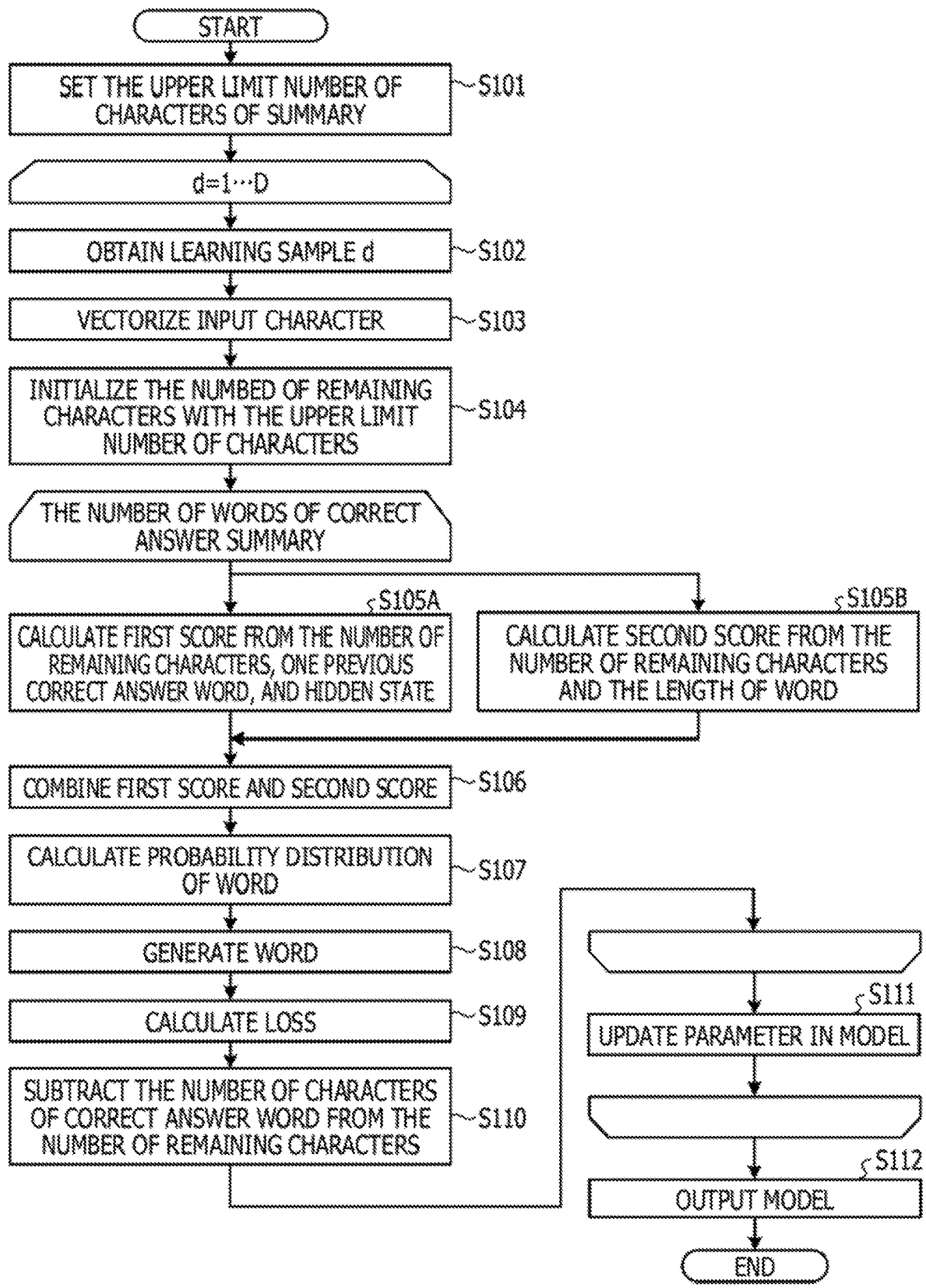
FIG. 9 is a flowchart illustrating the steps of learning processing according to Embodiment 1.

FIG. 9 is a flowchart illustrating the steps of learning processing according to Embodiment 1. As an example, this learning processing is started in response to reception of a request for model learning. As illustrated in FIG. 9, the input control unit 13 sets the upper limit number of characters of a summary to be generated by the model (step S101). Then, processing in steps S102 to S111 is executed on each set of D learning samples d included in learning data.

That is, the input control unit 13 obtains one learning sample d of learning data stored in the learning data storage unit 11 (step S102). Then, the input control unit 13 inputs learning input text included in the learning sample d obtained in step S102 to the RNN encoder (step S103). Thus, a word string in the learning input text is converted to an intermediate representation.

The input control unit 13 initializes the value at a register holding the number of remaining characters until the RNN decoder is caused to output an EOS tag to the upper limit number of characters set in step S101 (step S104).

After that, processing in steps S105 to S110 is executed at each time sequentially from the beginning of M words in a correct answer summary.

That is, the input control unit 13 inputs the number of remaining characters held at the register and a BOS tag or a correct answer word at one previous time to an LSTM corresponding to the current time in the RNN decoder (step S105A). By inputting them into the LSTM, a first score for each word element at the current time is calculated, and the intermediate representation of the learning input text is updated.

The calculating unit 16 calculates an inner product of a distribution representation of the length of the word and a distribution representation of the number I of remaining characters for each word element to calculate a second score for each word element (step S105B).

The combining unit 17 performs linear combination that adds the first score output from the LSTM and the second score calculated by the calculating unit 16 for each word element to combine the first score and the second score (step S106).

Then, the combining unit 17 normalizes the combined score acquired by combining the first score and the second score in step S106 to generate a distribution of generation probabilities of words (step S107). Then, the generating unit 18 generates a word having the highest probability in the distribution of the generation probabilities of the words (step S108). Then, the updating unit 19 calculates a loss at the current time from the word corresponding to the current time of the words included in the correct answer summary and the word generated in step S108 (step S109).

After that, the input control unit 13 subtracts the number of characters of the word generated in step S108 from the number of remaining characters held at the register to update the value of the number of remaining characters at the register (step S110).

Then, when a loss for each set of M words in the correct answer summary is calculated, the updating unit 19 executes log-likelihood optimization based on the loss of each LSTM so that parameters to update the model of the RNN decoder are calculated, and the parameters in the model stored in the model storage unit 12 are updated (step S111).

Then, after the parameters of the model are updated for all of the learning samples d included in learning data, the learning apparatus 10 outputs the trained model to the generating apparatus 30 (step S112), and the processing is ended.

Figure 10:
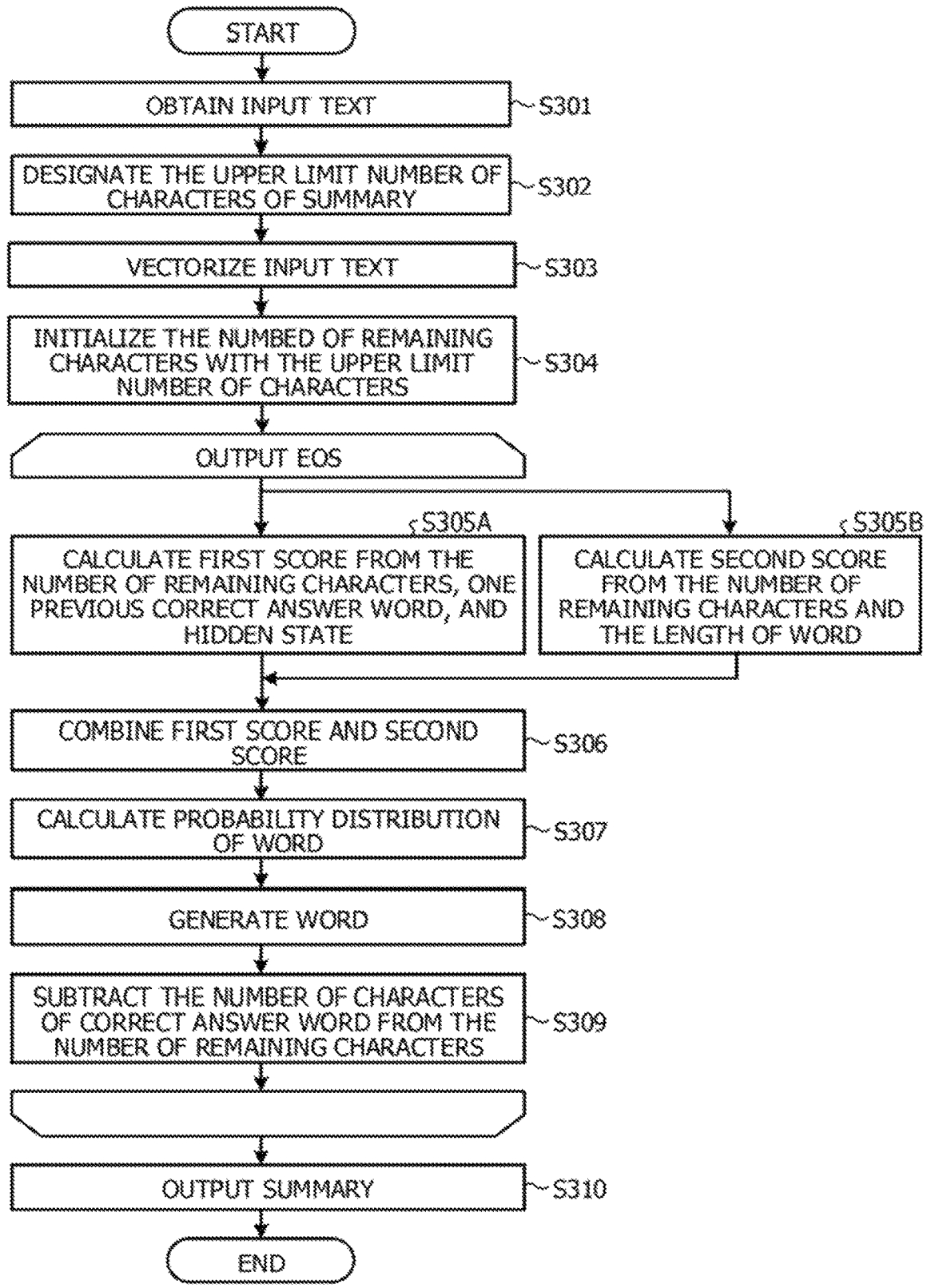
FIG. 10 is a flowchart illustrating the steps of generation processing according to Embodiment 1.

FIG. 10 is a flowchart illustrating the steps of generation processing according to Embodiment 1. As an example, this processing is started in response to reception of a request for summary generation. As illustrated in FIG. 10, the input control unit 31 obtains input text and a designation of the upper limit number of characters of the summary to be generated by the trained model (steps S301 and S302). After that, the input control unit 31 inputs the input text to the RNN encoder (step S303). Thus, a word string in the input text is converted to an intermediate representation.

The input control unit 13 initializes the value at a register holding the number of remaining characters until the RNN decoder is caused to output an EOS tag to the upper limit number of characters designated in step S302 (step S304).

After that, processing in steps S305 to S309 is executed until the EOS tag is output from the RNN decoder.

That is, the input control unit 31 inputs the number of remaining characters held at the register and a BOS tag or a word at one previous time to an LSTM corresponding to the current time in the RNN decoder (step S305A). By inputting them into the LSTM, a first score for each word element at the current time is calculated, and the hidden state is updated.

The calculating unit 33 calculates an inner product of a distribution representation of the length of the word and a distribution representation of the number I of remaining characters for each word element to calculate a second score for each word element (step S305B).

The combining unit 34 performs linear combination that adds the first score output in step 305A and the second score calculated by the calculating unit 33 for each word element to combine the first score and the second score (step S306).

Then, the combining unit 34 normalizes the combined score acquired by combining the first score and the second score at step S306 to generate a distribution of generation probabilities of words (step S307). Then, the generating unit 35 generates a word having the highest probability in the distribution of the generation probabilities of the words (step S308).

After that, the input control unit 31 subtracts the number of characters of the word generated in step S308 from the number of remaining characters held at the register to update the value of the number of remaining characters at the register (step S309).

Then, when an EOS tag is output from the RNN decoder, the generating unit 35 joins words generated sequentially from the first LSTM to the Lth LSTM to generate a summary and outputs the generated summary to a predetermined output destination (step S310), and the processing is ended.

As described above, the learning apparatus 10 and the generating apparatus 30 according to this embodiment combine a second score acquired from the length of a word and the number of remaining characters up to the upper limit number of characters of a summary for each word in the dictionary of the model with a first score output from the model for each word in the dictionary to calculate a distribution of generation probabilities of the word. Therefore, with the learning apparatus 10 and the generating apparatus 30 according to this embodiment, the number of characters of a word generated by the model in vicinity of the upper limit number of characters of a summary may be brought closer to the number of remaining characters.

Heretofore, the embodiments of the apparatus of the present disclosure have been described. It is to be understood that embodiments may be made in various ways other than the aforementioned embodiments. Therefore, other embodiments are described below.

The components illustrated in the drawings do not necessarily have to be physically configured as illustrated in the drawings. Specific forms of the separation and integration of the devices are not limited to the illustrated forms, and all or a portion thereof may be separated and integrated in any units in either a functional or physical manner depending on various loads, usage states, and the like. For example, the input control unit 13, the model executing unit 15, the calculating unit 16, the combining unit 17, the generating unit 18 and the updating unit 19 may be coupled with the learning apparatus 10 over a network as external devices. The input control unit 13, the model executing unit 15, the calculating unit 16, the combining unit 17, the generating unit 18 and the updating unit 19 may be provided in separate apparatuses and may be coupled over a network for cooperation to implement the functions of the learning apparatus 10.

The various kinds of processing described in the above embodiments may be implemented by executing a program prepared in advance on a computer such as a personal computer or a work station. In the following, with reference to FIG. 11, a description is given of an example of a computer for executing a learning program having the same functions as those of the above-described embodiments.

Figure 11:
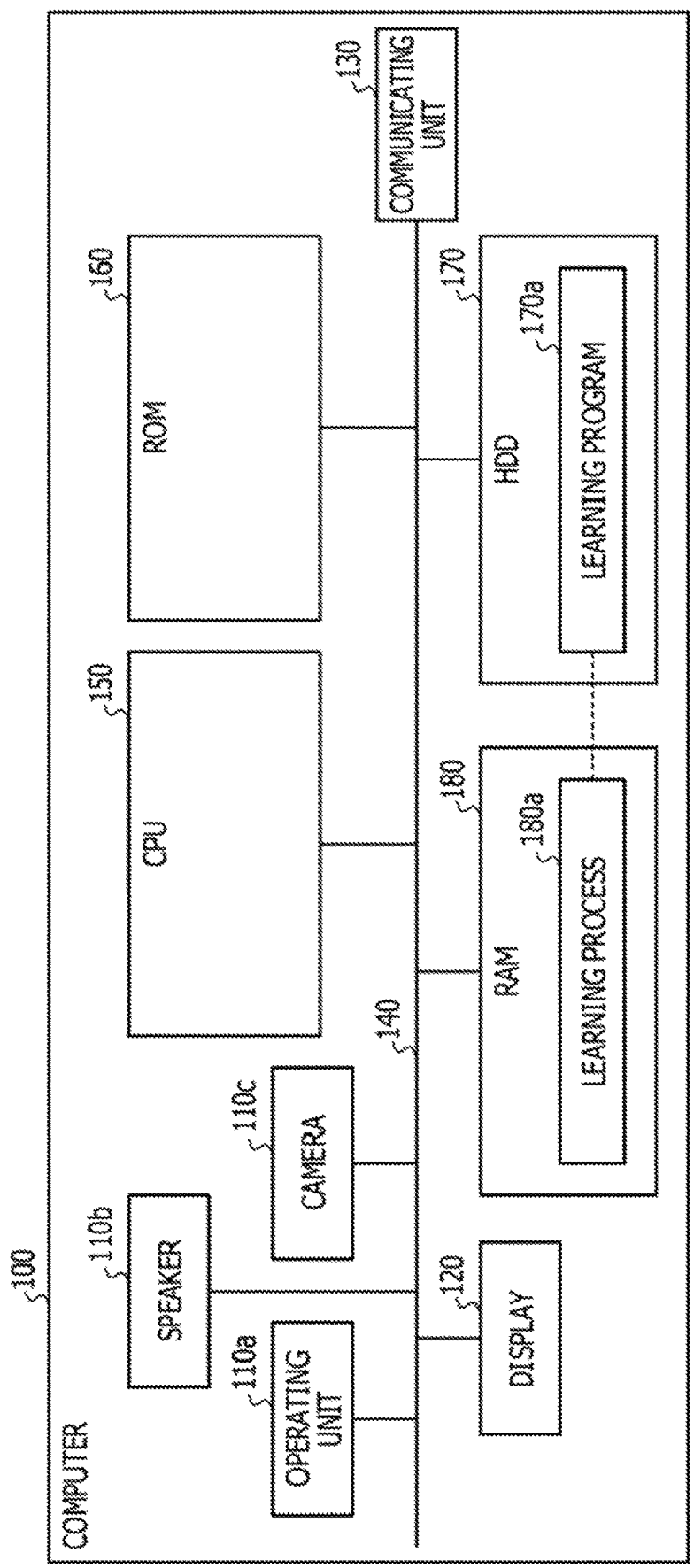
FIG. 11 is a diagram illustrating an exemplary hardware configuration of a computer configured to execute a learning program according to Embodiments 1 and 2.

FIG. 11 is a diagram illustrating an exemplary hardware configuration of a computer configured to execute a learning program according to Embodiments 1 and 2. As illustrated in FIG. 11, a computer 100 includes an operation unit 110a, a speaker 110b, a camera 110c, a display 120, and a communication unit 130. Further, the computer 100 includes a CPU 150, a read-only memory (ROM) 160, an HDD 170, and a RAM 180. These units 110 to 180 are coupled to each other via a bus 140.

As illustrated in FIG. 11, the HDD 170 stores a learning program 170a including a plurality of instructions for implementing the same functions as those of the input control unit 13, the model executing unit 15, the calculating unit 16, the combining unit 17, the generating unit 18 and the updating unit 19 according to Embodiment 1. The learning program 170a may be provided integrally or separately like the components of the input control unit 13, the model executing unit 15, the calculating unit 16, the combining unit 17, the generating unit 18 and the updating unit 19 illustrated in FIG. 1. In other words, for example, the HDD 170 may not store all data described according to Embodiment 1, but data to be used for processing may be stored in the HDD 170.

Under such an environment, the CPU 150 loads the learning program 170a from the HDD 170 into the RAM 180. As a result, the learning program 170a functions as a learning process 180a as illustrated in FIG. 11. The learning process 180a unarchives various kinds of data read from the HDD 170 in an area allocated to the learning process 180a in the storage area included in the RAM 180, and executes various kinds of processing using these various kinds of data thus unarchived. For example, the processing performed by the learning process 180a includes the processing illustrated in FIGS. 9 and 10. Not all the processing units described in Embodiment 1 necessarily have to operate on the CPU 150, but only a processing unit(s) required for the processing to be executed may be virtually implemented.

The learning program 170a does not necessarily have to be initially stored in the HDD 170 or the ROM 160. For example, the learning program 170a is stored in a "portable physical medium" such as a flexible disk called an FD, a CD-ROM, a DVD disk, a magneto-optical disk, or an IC card, which will be inserted into the computer 100. Then, the computer 100 may acquire the learning program 170a from the portable physical medium, and execute the program 170a. Further, the learning program 170a may be stored in another computer or server apparatus coupled to the computer 100 via a public line, the Internet, a local area network (LAN), a wide area network (WAN), or the like, and the computer 100 may acquire the learning program 170a from the other computer, and execute the program 170a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented learning method comprising:
    obtaining, for each of one or more words included in a dictionary of a model, a combined score by combining a first score and a second score, the first score being a score outputted from the model in response to inputting a character string to the model, the second score being a score calculated based on a length of that word and a number of remaining characters up to an upper limit number of characters of a summary;
    calculating, based on the combined score, a probability distribution of the one or more words; and
    updating, based on the calculated probability distribution, parameters in the model to generate a summary of the character strings,
    the second score for a first word having a shorter word length than the number of the remaining characters is higher than the second score for a second word having a longer word length than the number of the remaining characters, the first word and the second word being included in the one or more words.

2. The learning method according to claim 1, wherein the model is incorporated into an article summary program configured to generate a summary of an article in response to input of the article as the character string.

3. A generating apparatus comprising:
    a memory; and
    a processor coupled to the memory and the processor configured to perform processing including:
        receiving a character string,
        obtaining, for each of one or more words included in a dictionary of a model, a combined score by combining a first score and a second score, the first score being a score outputted from the model in response to inputting a character string to the model, the second score being a score calculated based on a word length of that word and a number of remaining characters up to an upper limit number of characters of a summary,
        calculating, based on the combined score, a probability distribution of the one or more words, and
        updating, based on the calculated probability distribution, parameters in the model to generate a summary of the character strings,
        the second score for a first word having a shorter word length than the number of the remaining characters is higher than the second score for a second word having a longer word length than the number of the remaining characters, the first word and the second word being included in the one or more words.

4. The generating apparatus according to claim 3, wherein the processor is configured to update the number of the remaining characters based on word length of the first word.

5. A non-transitory computer-readable medium storing instructions which, when the instructions are executed by one or more computers, cause the one or more computers to perform processing, the processing comprising:
    receiving a character string;
    obtaining, for each of one or more words included in a dictionary of a model, a combined score by combining a first score and a second score, the first score being a score outputted from the model in response to inputting a character string to the model, the second score being a score calculated based on a word length of that word and a number of remaining characters up to an upper limit number of characters of a summary;
    calculating, based on the combined score, a probability distribution of the one or more words; and
    updating, based on the calculated probability distribution, parameters in the model to generate a summary of the character strings,
    the second score for a first word having a shorter word length than the number of the remaining characters is higher than the second score for a second word having a longer word length than the number of the remaining characters, the first word and the second word being included in the one or more words.

6. The medium according to claim 5, wherein the processing further comprises updating the number of the remaining characters based on word length of the first word.

* * * * *